US009702371B2

(12) United States Patent
Meuter et al.

(10) Patent No.: US 9,702,371 B2
(45) Date of Patent: Jul. 11, 2017

(54) SEALING ARRANGEMENT AND PUMP HAVING A SEALING ARRANGEMENT

(71) Applicant: Sulzer Pumpen AG, Winterthur (CH)

(72) Inventors: Paul Meuter, Seuzach (CH); Thomas Welschinger, Radolfzell (DE)

(73) Assignee: Sulzer Management AG, Winterthur (CH)

( * ) Notice: Subject to any disclaimer, the term of this patent is extended or adjusted under 35 U.S.C. 154(b) by 154 days.

(21) Appl. No.: 14/378,387

(22) PCT Filed: Nov. 1, 2012

(86) PCT No.: PCT/EP2012/071654
§ 371 (c)(1),
(2) Date: Aug. 13, 2014

(87) PCT Pub. No.: WO2013/120549
PCT Pub. Date: Aug. 22, 2013

(65) Prior Publication Data
US 2015/0159669 A1    Jun. 11, 2015

(30) Foreign Application Priority Data
Feb. 14, 2012    (EP) ..................... 12155346

(51) Int. Cl.
*F04D 1/06*    (2006.01)
*F04D 29/08*   (2006.01)
(Continued)

(52) U.S. Cl.
CPC .............. *F04D 29/08* (2013.01); *F04D 1/06* (2013.01); *F04D 1/063* (2013.01); *F04D 29/086* (2013.01);
(Continued)

(58) Field of Classification Search
CPC . F04D 1/06; F04D 1/063; F04D 29/08; F04D 29/085; F04D 29/426; F16J 15/061; F16J 15/08; F16J 15/104
See application file for complete search history.

(56) References Cited

U.S. PATENT DOCUMENTS 4,909,705 A * 3/1990 Katsura ................... F04D 1/063
                                                                    277/411
5,207,560 A * 5/1993 Urban ....................... F04D 7/06
                                                                    277/411
(Continued)

FOREIGN PATENT DOCUMENTS

DE    202005006997 U1    7/2005
EP        0766007 A1     4/1997

OTHER PUBLICATIONS

International Search Report from PCT Application No. PCT/EP2012/071654 dated Mar. 13, 2013 (3 pages).

*Primary Examiner* — Woody Lee, Jr.
(74) *Attorney, Agent, or Firm* — Kilpatrick Townsend & Stockton LLP (57) ABSTRACT

The invention relates to a sealing arrangement for a high-pressure space having a bounding element and a termination element. The bounding element has an outer sealing surface and the termination element has an inner sealing surface. The outer sealing surface and the inner sealing surface are arranged such that a sealing-off of the high-pressure space is achieved via a contact of the two sealing surfaces. In accordance with the invention the bounding element is designed such that a force in the direction of the inner sealing surface can act on the outer sealing surface due to a pressure in the high-pressure space. Thereby a sealing function is also achieved then when the termination element deforms due to the pressure in the high-pressure space. The (Continued)

sealing arrangement in accordance with the invention can be used particularly advantageously in pumps.

13 Claims, 4 Drawing Sheets

(51) Int. Cl.
*F04D 29/42* (2006.01)
*F16J 15/06* (2006.01)
*F16J 15/08* (2006.01)
*F16J 15/10* (2006.01)

(52) U.S. Cl.
CPC .......... *F04D 29/426* (2013.01); *F16J 15/061* (2013.01); *F16J 15/08* (2013.01); *F16J 15/104* (2013.01)

(56) References Cited

U.S. PATENT DOCUMENTS

| | | | | |
|---|---|---|---|---|
| 5,456,577 | A | * 10/1995 | O'Sullivan | ................ F04D 1/06 415/140 |
| 5,846,052 | A | * 12/1998 | Kameda | ................ F04D 29/086 415/182.1 |
| 2014/0178182 | A1 | * 6/2014 | Huth | ................ F04D 29/083 415/170.1 |

* cited by examiner

SEALING ARRANGEMENT AND PUMP HAVING A SEALING ARRANGEMENT

This application is a U.S. National Phase of International Application No. PCT/EP2012/071654, filed Nov. 1, 2012, which claims priority to European Patent Application No. 12155346.5, filed Feb. 14, 2012, the disclosures of which are incorporated by reference herein.

The invention relates to a sealing arrangement in accordance with the preamble of claim 1 and to a pump having a sealing arrangement.

Pressure spaces, for example, of pumps must be sealed off with regard to their environment. This is, in particular necessary at positions at which two components, such as, for example, a housing and a cover of a pressure space are to be combined. In this connection gaps can arise through which a fluid contained in the pressure space can exit in the case of a high-pressure space. The gap, for example, arises due to component tolerances or different thermal expansion behavior of different components. A further important reason for the appearance of gaps are deformations of components due to high pressures in the pressure space. For sealing such gaps different sealing arrangements are known, for example, the use of a so-called O-ring is known which is typically manufactured from an elastomeric material. The requirements on such sealing arrangements depend on different parameters, such as, for example, the pressures present, the prevailing temperatures or the size of the gap. On the use of elastomeric O-rings at high-pressures and for large gap sizes it can, for example, lead to a so-called extrusion of material of the O-ring in the gap in the direction of the low-pressure. In this respect the O-ring is pressed into the gap which leads to a damage of the O-ring and therefore to a failure of the sealing arrangement and undesired leakages at the sealing arrangement.

In order to prevent an extrusion of an O-ring so-called support rings are known which, for example, have a rectangular cross-section. Such support rings are arranged as an additional component at the side of the O-ring remote from the pressure and prevent the extrusion of the O-ring into the gap. In this respect they, however, do not take over any sealing function. For example, DE 100 00 084 A1 describes a support ring for preventing the extrusion of an elastomeric O-ring.

Another possibility of maintaining the functionality of the sealing arrangement consists in limiting the formation of gaps during the operation of the pump, for example. For this purpose, the components, between which the gap arises, can be designed so stiff, so that only so small gap spacings arise that the functionality of the sealing arrangement is not endangered also for high-pressures. In order to achieve this, for example, large wall thicknesses and/or complex ribbings can be provided.

For other sealing arrangements which, for example, use O-rings of metal or flat seals, an extrusion of the sealing element does not represent a problem. However, such sealing arrangements only function reliably for comparatively small gap sizes. Therefore, the gap size cannot be too large also for such sealing arrangements.

In contrast to this it is the object of the invention to provide a cost-effective and functionally safe sealing arrangement for a high-pressure space. In accordance with the invention this object is satisfied with a sealing arrangement having the features of claim 1.

The sealing arrangement for a high-pressure space has a bounding element having an outer sealing surface and a termination element having an inner sealing surface. The outer sealing surface and the inner sealing surface are in this respect arranged such that a sealing off of the high-pressure space is achieved by a contact of the two sealing surfaces. The bounding element is designed as a part of a housing of the high-pressure space or as a separation element between different pressure spaces, for example, of a pump. The termination element can, for example, be designed as a part of a housing of the high-pressure space or as a separation element between different pressure spaces, for example, of a pump. The bounding element and the termination element can, for example, be screwed with one another. However, it is also possible that the bounding element is introduced into the termination element without further attachment elements, for example.

The termination element or the bounding element can, for example, be designed as a lid or a housing of a pump. The bounding element and the termination element therefore together form at least a part of the boundary of the high-pressure space. In this connection a high-pressure space should be understood to be a pressure space in which, during the operation of the arrangement present in the pressure space, for example a pump, a higher pressure is present than for the side lying remote from the sealing arrangement.

In accordance with the invention, the bounding element is designed such that a force in the direction of the inner sealing surface can act on the outer sealing surface due to a pressure in the high-pressure space. As described, the pressure in the high-pressure space is higher during operation of the arrangement contained in the high-pressure space than the pressure on the side of the sealing arrangement remote from this. Due to the design of the sealing arrangement in accordance with the invention a force acts on the outer sealing surface due to the pressure in the high-pressure space and therefore onto a part of the bounding element, which presses the outer sealing surface onto the inner sealing surface of the termination element.

For this purpose, the bounding element is designed at least in the region of the outer sealing surface so flexible that it can balance out a movement of the inner sealing surface of the termination element. The bounding element and the termination element are, for example, manufactured from steel, wherein wall thicknesses are selected such that the required flexibility is ensured.

Thus, the formation of a gap between the two sealing surfaces can be effectively counteracted and thus the functionality of the sealing arrangement is ensured. In order to achieve this no further component is required. It is rather sufficient to design the bounding element in accordance with the invention.

The bounding element, in particular has a cylindrical base shape in the region of the outer sealing surface. The outer sealing surface can in this respect be orientated radially or axially.

In an embodiment of the invention the bounding element has a projecting collar which forms at least a part of the outer sealing surface. The collar is designed such that the pressure in the high-pressure space acts on an inner surface of the collar lying opposite of the outer sealing surface. A force acts in the direction of the termination element onto the projecting collar due to the pressure present at the inner surface of the collar. Therefore a force acts in the direction of the inner sealing surface onto the outer sealing surface. The bounding element can be designed particularly simply and therefore cost-effectively for this embodiment.

In an embodiment of the invention the bounding element has a recess open in the direction of the high-pressure space. The same pressure is present in the recess as is present in the high-pressure space due to the opening towards the high-pressure space. The recess is arranged such that at least a part of the outer sealing surface is arranged between the recess and the inner sealing surface of the termination element. Also the overall sealing surface can be arranged between the recess and the inner sealing surface. Therefore the part of the bounding element having the outer sealing surface also has a certain flexibility and is pressed in the direction of the inner contact surface by the pressure present in the recess. For this embodiment the bounding element requires very little construction space. The bounding element can be carried out particularly short in the axial direction for a substantially cylindrically shaped design of the outer sealing surface.

In an embodiment of the invention the termination element is designed such that a force can act on the inner sealing surface in the direction of the outer sealing surface due to the pressure in the high-pressure space. In particular, the termination element has a second recess open in the direction of the high-pressure space and which is arranged such that at least a part of the inner sealing surface is arranged between the second recess and the outer sealing surface of the bounding element.

Therefore the inner and the outer sealing surfaces are pressed from both sides towards one another, so that a particularly good sealing effect can be achieved.

In an embodiment of the invention the bounding element or the termination element has a sealing element, wherein the sealing element is, in particular designed as an O-ring of an elastomeric material or of metal. It is also possible that two or more sealing elements in particular O-rings are arranged next to one another. It is also possible that both the bounding element and also the termination element have a sealing element. The sealing element can also be designed as a different type of seal, for example in the form of a metal seal, a flat seal, or a coating, for example with an elastomeric material. In this embodiment of the sealing arrangement the sealing element is either considered to be associated with the bounding element or with the termination element. On using a sealing element a particularly good sealing off of the high-pressure space can be achieved. Furthermore, larger gap sizes can be permitted on the use of a sealing element.

The O-ring can be arranged in a groove of the bounding element or of the termination element. It is, however, also possible that the bounding element and the termination element are designed and arranged such that they form a reception space in which an O-ring is arranged. The bounding element and the termination element have corresponding edges or steps for this purpose which, in particular form a rectangular reception space in cross-section for the O-ring. Therefore, it is not necessary to provide a groove at the bounding element or the termination element which makes the manufacture of the bounding element or the termination element particularly simple.

The advantages of the sealing arrangement in accordance with the invention, are particularly effective on use in a pump. The pump is provided for conveying a gas-like or liquid fluid, such as, for example water, oil or similar substances. Very high-pressures of up to 800 bar can be present in pumps which is why functionally safe sealing arrangements are particularly important also for arising deformations of different components of the pump. The sealing arrangement can be used for sealing off a high-pressure space towards the outside of the surrounding of the pump. However, it is also possible to use the sealing arrangement in accordance with the invention for sealing off different pressure spaces in the interior of the pump. Each leak between pressure spaces of the pump separated from one another leads to losses and therefore to increased costs of operation on operation of the pump.

The pump is, in particular designed as a multi step radial centrifugal pump. For such a pump at least two pump steps each having an impeller are arranged behind one another.

In an embodiment of the invention the pump has at least a first and a second downstream partial pump, wherein the high-pressure space is designed, in particular as an outlet space of the second partial pump. In this respect "downstream" is to be understood such that an outlet of the first partial pump is connected to an inlet of the second partial pump. The two partial pumps can each have one pump step or also more pump steps. The bounding element is in this respect designed as a separation element between the first and second partial pump. In this connection the bounding element in particular has a cylindrical outer contour at which the outer sealing surfaces are formed. The termination element is in this respect formed in particular by an outer housing of the pump.

Therefore, leakages between pressure space in the interior of the pump are effectively prevented so that a higher degree of efficiency and therefore lower costs of operation of the pump are enabled.

In an embodiment of the invention the pump has a first pump outlet and a second pump outlet, wherein the first pump outlet is connected to an outlet of the first partial pump and the second pump outlet is connected to the outlet of the second partial pump. Therefore, the pressure at the first pump outlet is smaller than at the second pump outlet. Such a pump therefore has two different outlet pressures. The bounding element is in this respect arranged between the first and the second pump outlet. A particularly large pressure difference is present between the two pump outlets which is why an effective sealing off of the pressure spaces is particularly important.

In an embodiment of the invention the first and the second partial pumps are arranged in the pump so that a first flow direction in the first partial pump and a second flow direction in the second partial pump are orientated opposite from one another. In this respect the mentioned flow direction relates to the flow direction into an inlet of an impeller of a partial pump. The pump then has a so-called back-to-back arrangement. This arrangement has the advantage that axial forces arising at the impellers at least partially compensate one another and therefore the journaling of the pump is simpler and requires less construction space. The bounding element is in this case arranged between the outlet of the first partial pump and an inlet of the second partial pump.

In an embodiment of the invention the bounding element has at least one transfer passage. A transfer passage, which can also be referred to as a "cross-over" passage, is to be understood as a passage which dedicatedly guides fluid from a side of the bounding element to the other side. For example, the bounding element can have a transfer passage from the outlet of the first partial pump to the first pump outlet for a pump having two pump outlets. The bounding element can have a first transfer passage from the outlet of the first partial pump to the inlet of the second partial pump and a second transfer passage from the outlet of the second partial pump to the pump outlet for a pump in the above-described back-to-back arrangement. Therefore, the bounding element can have a guide function for the fluid beside the sealing function whereby a pump having a few components is enabled.

Further advantages features and particulars of the invention result from the following description of embodiments as well as from the drawings, in which the same elements or elements having the same function are referred to using identical reference numerals.

In this respect there is shown.

Figure 1:
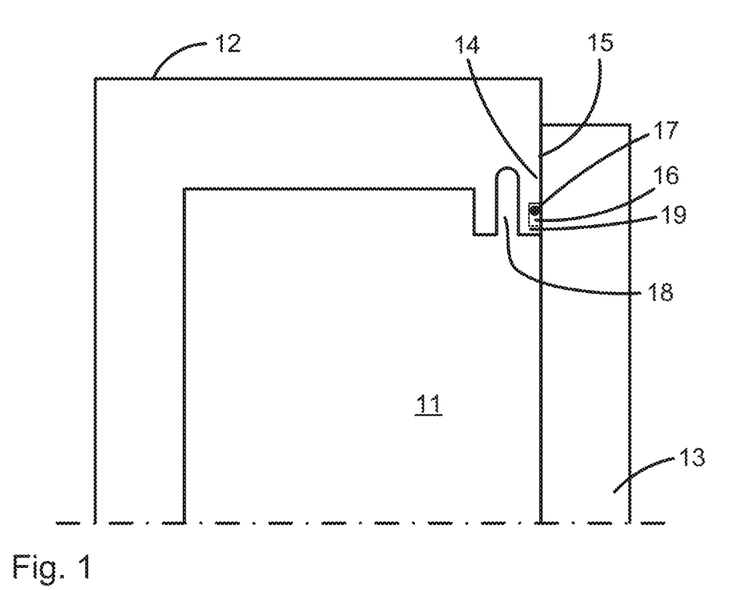
FIG. 1 a high-pressure space with an axially aligned sealing arrangement.

In accordance with FIG. 1 only one schematically illustrated rotationally symmetric high-pressure space 11 is bounded by a bounding element 12 and a termination element 13 which are parts of a sealing arrangement for the high-pressure space 11. The bounding element 12 has a beaker-like base shape and is terminated by the disk-like termination element 13. The termination element 13 is connected to the bounding element 12 in FIG. 1 by a non-illustrated screw coupling. Therefore a contact between an outer sealing surface 14 of the bounding element 12 and an inner sealing surface 15 of the termination element 13 is present. The outer sealing surface 14 of the bounding element 12 has a surrounding groove 16 in which an O-ring 17 of an elastomeric material is arranged. The groove and the O-ring can also be arranged in the termination element. A second O-ring can also be arranged in parallel to this O-ring.

The bounding element 12 has a recess 18 open to the pressure space 11 which is arranged so that the groove 16 and the O-ring 17 and therefore a part of the outer contact surface 14 is arranged between the recess 18 and the inner contact surface 15 of the termination element 13. Therefore, a surrounding boundary region 19 results at the bounding element 12 at which the groove 16 and the O-ring 17 are arranged. This boundary region 19 is at least elastic in a limited manner in the axial direction.

If the pressure in the high-pressure space 11 is higher than outside of the high-pressure space 11 then a force acts outwardly in an axial direction on the termination element 13. This force can be so large that the termination element 13 bulges outwardly. If the boundary region 19 of the bounding element 12 would maintain its position unchanged then a gap would result between the bounding element 12 and the termination element 13. This gap could be so large that the O-ring 17 could be pressed from the outside into the gap and be damaged thereby. The inward pressing of an O-ring into a gap is also referred to as extrusion.

The same pressure is present in the recess 18 as in the high-pressure space 11 through the opening of the recess 18 in the direction of the high-pressure space 11. Therefore, a force also acts on the boundary region 19 and therefore also onto the outer contact surface 14 of the bounding element 12 which force is directed outwardly, i.e. in the direction of the inner contact surface 15 of the termination element 13. The boundary region 19 also moves outwardly for a described bulging of the termination element 13 in accordance with the bulging of the termination element 13 through the mentioned elasticity of the boundary region 19. Therefore the generation of a gap between the bounding element 12 and the termination element 13 is prevented, so that the sealing function of the O-ring 17 remains maintained also for a possible bulging of the termination element 13.

Figure 2:
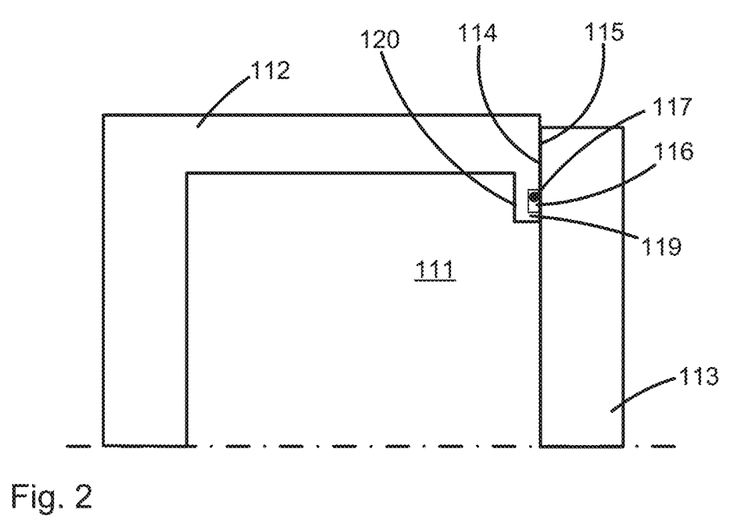
FIG. 2 a high-pressure space with an axially aligned sealing arrangement in a second embodiment.

A second embodiment of a sealing arrangement is illustrated in FIG. 2. The assembly of the sealing arrangement in this respect has many similarities to the sealing arrangement from FIG. 1 which is why reference is only made to the differences.

A bounding element 112 has an inwardly orientated projecting collar 119 which at least in axial direction has a certain flexibility. A part of an outer contact surface 114 of the bounding element 112, as well as a surrounding groove 116 and a therein arranged O-ring 117 are arranged at the collar 119. The outer contact surface 114 of the bounding element 112 and the O-ring 117 are in contact with an inner contact surface 115 of a termination element 113.

The collar 119 has an inner surface 120 in parallel to an outer contact surface 114 of the bounding element 112 onto which a pressure present in the high-pressure space 111 acts. The collar 119 of the bounding element 112 moves analogous to the boundary region 16 of FIG. 1 also outwardly for a possible bulging of the termination element 113 towards the outside.

Figure 3:
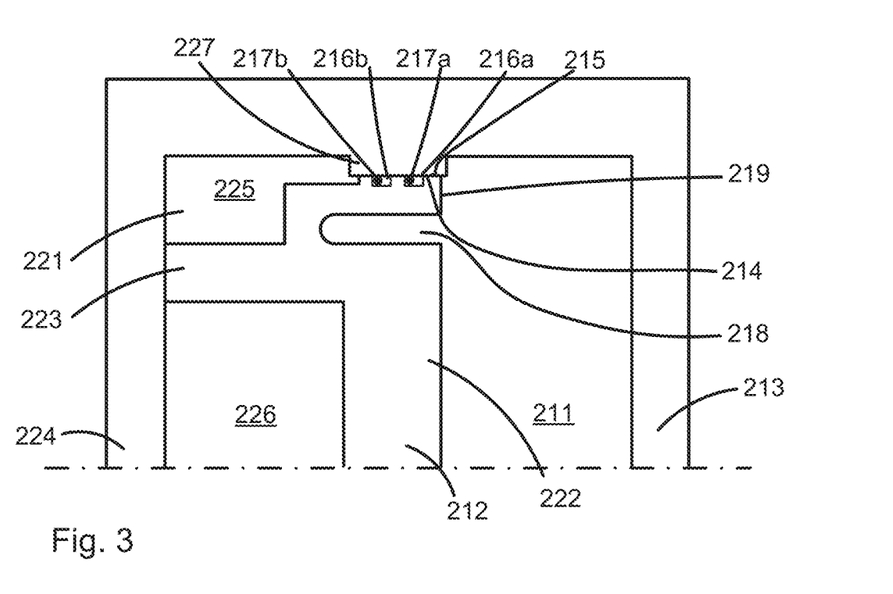
FIG. 3 a high-pressure space with a radially aligned sealing arrangement.

In accordance with FIG. 3, only a schematically illustrated rotationally schematic high-pressure space 211 is bounded by a bounding element 212 and a termination element 213 which are parts of a radially aligned sealing arrangement for the high-pressure space 211. The termination element 213 is designed as a generally cylindrically shaped housing which is divided by the bounding element 212 in the high-pressure space 211 and a low-pressure space 221. The bounding element 212 is designed from one piece and is composed of a generally disk-like base element 222 and a generally cylindrically shaped support element 223. The base element 222 separates the high-pressure space 211 from the low-pressure space 221 and for this purpose supports itself via the support element 223 at a base surface 224 of the termination element 213 lying opposite of the high-pressure space 211. The support element 223 has, non-illustrated, radially aligned through passages, whereby an outer region 225 is connected to an inner region 226 of the low-pressure space 221.

The base element 222 of the bounding element 212 has a radially outwardly surrounding outer sealing surface 214 which is in contact with an inner sealing surface 215 of the termination element 213 and therefore seals off the high-pressure space 211 from the low-pressure space 221. The inner sealing surface 215 of the termination element 213 is in this respect formed at a surrounding inwardly projecting projection 227.

The outer sealing surface 214 of the bounding element 212 has two surrounding grooves 216a, 216b in which an O-ring 217a, 217b is respectively arranged for the pressure sealed sealing. The grooves and the O-ring can also be provided in the termination element. It is also possible that only one O-ring is provided.

The base element 222 of the bounding element 212 has a recess 218 open to the pressure space 211 which is arranged so that the grooves 216a, 216b and the O-rings 217a, 217b and in this case the overall outer contact surface 214 is arranged between the recess 218 and the inner contact surface 215 of the termination element 213. Thus, a surrounding boundary region 219 results at the bounding element 212 at which the grooves 216a, 216b and the O-rings 217a, 217b are arranged. This boundary region 219 is elastic at least in axial direction in a limited manner.

If the pressure in the high-pressure space 211 is higher than outside of the termination element 213 then a force acts outwardly in radial direction on the termination element 213. This force can be so large that the termination element 213 bulges outwardly. If the boundary region 219 of the bounding element 212 would maintain its position unchanged then a gap would result between the bounding element 212 and the termination element 213.

The same pressure is present in the recess 218 as in the high-pressure space 211 through the opening of the recess 218 in the direction of the high-pressure space 211. Therefore, an outwardly directed force also acts on the boundary region 219 and therefore also onto the outer contact surface 214 of the bounding element 212, i.e. in the direction of the inner contact surface 215 of the termination element 213. The boundary region 219 moves for a described bulging of the termination element 213 in accordance with the bulging of the termination 213 also outwardly due to the mentioned elasticity of the boundary region 219. Therefore, the generation of a gap between the bounding element 212 and the termination element 213 is prevented so that the sealing function of the O-rings 217a, 217b are maintained also for a corresponding bulging of the termination element 213.

Figure 4:
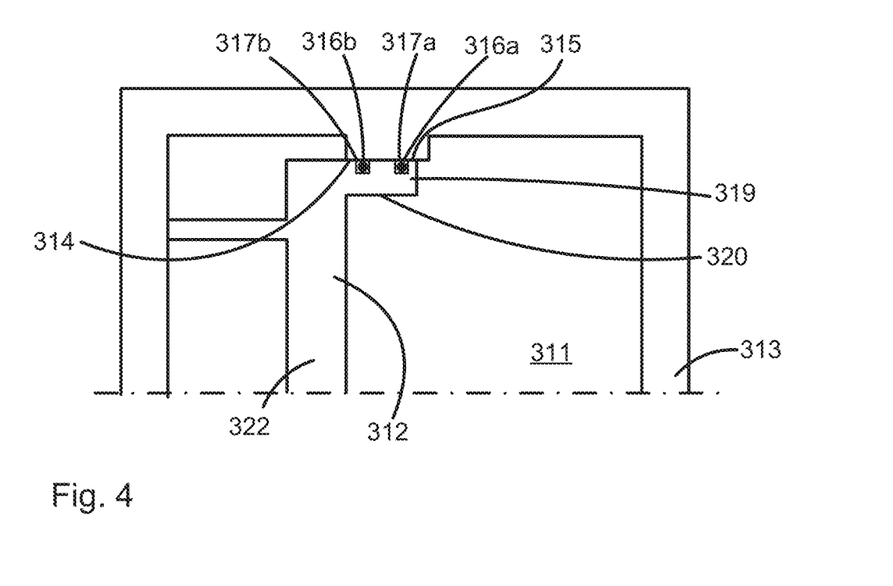
FIG. 4 a high-pressure space with a radially aligned sealing arrangement in a second embodiment.

In FIG. 4 a second embodiment of a radially arranged sealing arrangement is illustrated. In this connection the assembly of the sealing arrangement has many similarities to the sealing arrangement of FIG. 3 which is why only the differences will be addressed in the following.

A base element 322 of a bounding element 312 has an axially orientated projecting collar 319 which, at least in radial direction has a certain flexibility. A so-called outer contact surface 314 of the bounding element 312, as well as two surrounding grooves 316a, 316b with respective O-rings 317a, 317b arranged therein, are arranged at the collar 319. The outer contact surface 314 of the bounding element 312 and the O-rings 317a, 317b are in contact with an inner contact surface 315 of a termination element 313.

The collar 319 has an inner surface 320 in parallel to the outer contact surface 314 of the bounding element 312 onto which inner contact surface a pressure present in a high-pressure space 311 acts. The collar 319 of the bounding element 312 moves in an analogous manner to the boundary region 216 of FIG. 3 also towards the outside for a possible bulging of the termination element 313 towards the outside.

Figure 5:
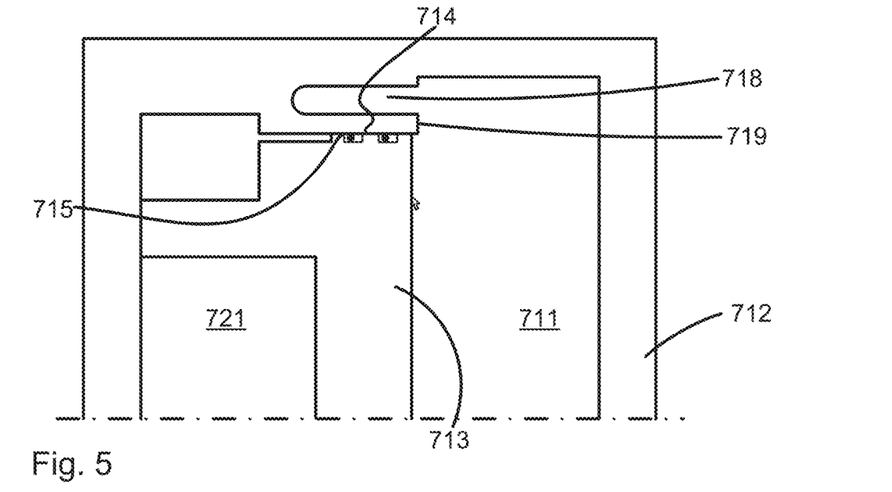
FIG. 5 a sealing region of a radially aligned sealing arrangement in a third embodiment.

A third embodiment of a radially aligned sealing arrangement is illustrated in FIG. 5. In this respect the assembly of the sealing arrangement has many similarities to the sealing arrangement of FIG. 3 which is why only the differences will be addressed.

In accordance with FIG. 5 a high-pressure space 711 is bounded by a bounding element 712 and a termination element 713 which are part of a radially arranged sealing arrangement for the high-pressure space 711. In contrast to FIG. 3 the bounding element 712 is designed as a substantially cylindrical shaped housing in this example which is divided by the termination element 713 into the high-pressure space 711 and into a low-pressure space 721.

The bounding element 712, designed as a housing, has a recess 718 open to the pressure space 711 which is arranged such that an overall outer contact surface 714 of the bounding element 712 is arranged between the recess 718 and an inner contact surface 715 of the termination element 713. Therefore a surrounding boundary region 719 results at the bounding element 712 which, to a limited degree is elastic, at least in axial direction.

Figure 6:
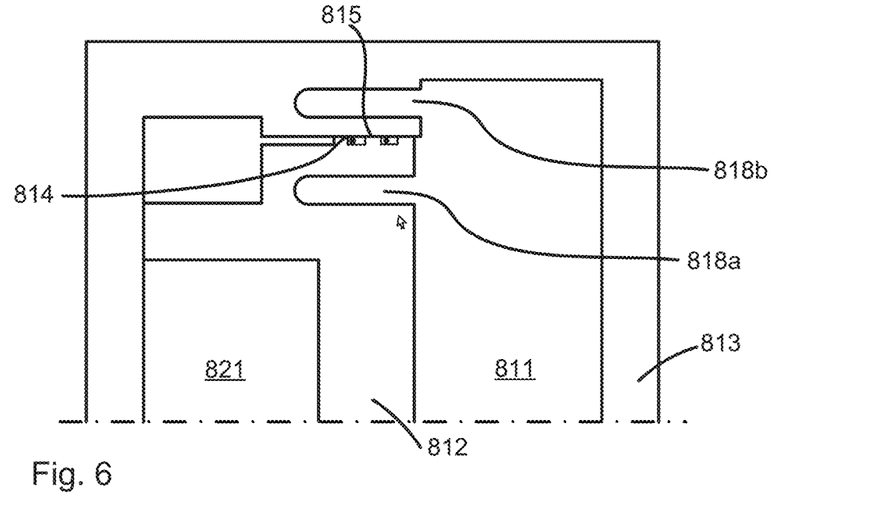
FIG. 6 a high-pressure space having a radially aligned sealing arrangement in a fourth embodiment.

A fourth embodiment of a radially aligned sealing arrangement is illustrated in FIG. 6. The assembly of the sealing arrangement is a combination of the sealing arrangements of FIG. 3 and FIG. 5.

In accordance with FIG. 6 a high-pressure space 811 is bounded by a bounding element 812 and a termination element 813 which are parts of a radially aligned sealing arrangement for the high-pressure space 811. Like in FIG. 3 the termination element 813 is designed as a substantially cylindrical-shaped housing which is divided by the bounding element 812 into the high-pressure space 811 and a low-pressure space 821.

The bounding element 812 has a recess 818a open to the pressure space 811 which is arranged so that an outer contact surface 814 of the bounding element 812 is arranged between the recess 818a and an inner contact surface 815 of the termination element 813.

Furthermore, the termination element 813 has an additional recess 818b open to the pressure space 811. This is arranged, so that the outer contact surface 814 of the bounding element 812 and the inner contact surface 815 of the termination element 813 are arranged between the two recesses 818a, 818b.

Figure 7:
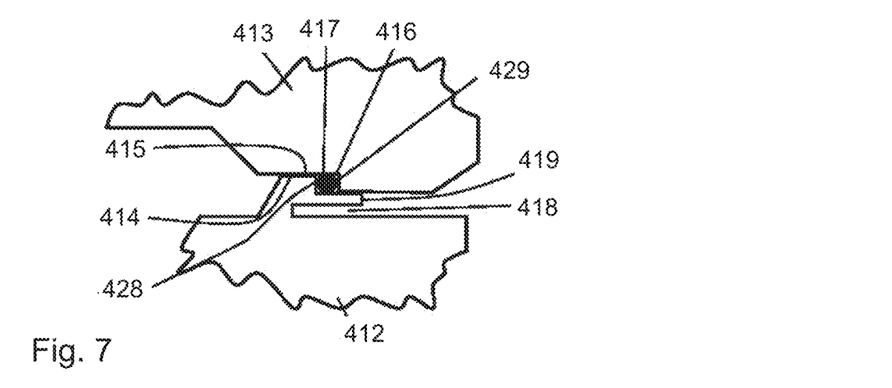
FIG. 7 a sealing region of a radially aligned sealing arrangement in a fifth embodiment.

A sealing region of a further embodiment of a radially orientated sealing arrangement is illustrated in FIG. 7. The principle assembly of the sealing arrangement is comparable to that of FIG. 3. The difference, beside the fact that only one O-ring 417 is used, exists therein that an outer contact surface 414 of a bounding element 412 is not designed planar and has a groove for an O-ring, but that it has a step 428 radially towards the inside. An inner contact surface 415 of a termination element 413 is also not of planar design and also has an axially displaced step 429. The steps 428 and 429 are designed and arranged so that they form a rectangular reception space 416 in cross-section, in which the O-ring 417 is arranged. The bounding element 412 has a recess 418 open in the direction of a non-further illustrated high-pressure space radially within the steps 428, 429 and therefore also of the reception space 416. Therefore the bounding element 412 also has a flexible boundary region 419 at which the reception space 416 and the O-ring 417 are arranged.

Figure 8:
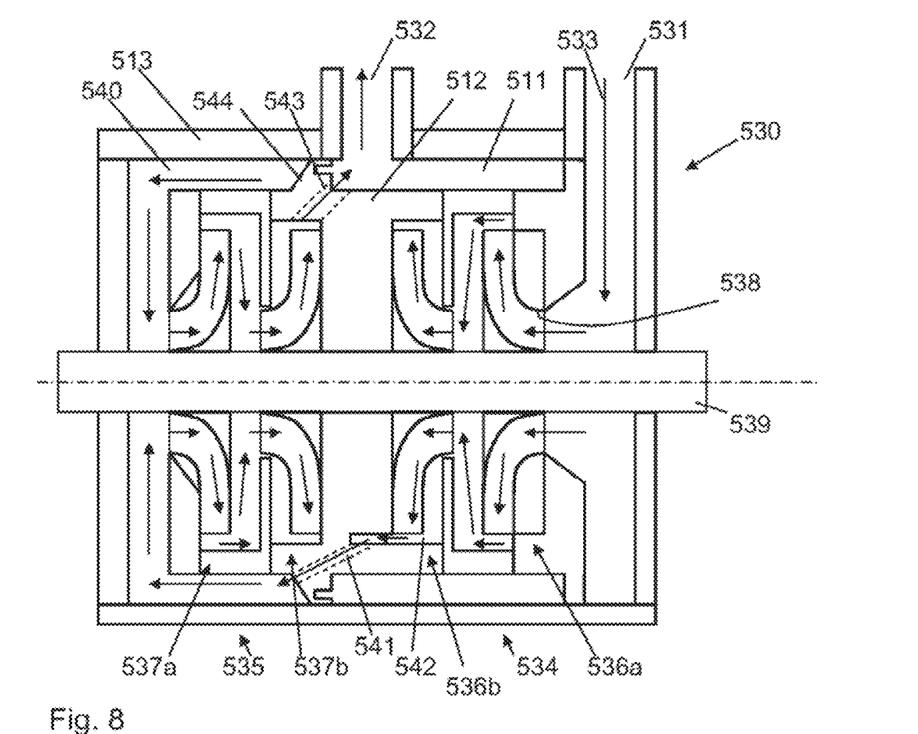
FIG. 8 a pump having two partial parts in back to back arrangement.

In accordance with FIG. 8 a pump 530 has a termination element 513 designed as a housing having a pump inlet 531 and a pump outlet 532. The pump 530 sucks fluid, for example in the form of water, via the pump inlet 513 and outputs the fluid via the pump outlet 532 at a higher pressure. The flow of the fluid in the pump 530 is indicated by arrows 533, wherein not every arrow is associated with a reference numeral. The pump 530 is defined as a pump having a first partial pump 534 and a second partial pump 535 downstream of this. The first partial pump 534 is composed of two pump steps 536a and 536b switched downstream of one another and the second partial pump 535 is composed of two pump steps 537a and 537b switched downstream of one another. The pump steps 536a, 536b, 537a, 537b are in principle identically designed. They all include an impeller 538 which is rotationally fixedly connected to a drive shaft 539. The drive shaft 539 is driven by a non-illustrated drive machine so that the impeller 538 rotates together with the drive shaft 538. A fluid is radially inwardly provided to the impeller 538 which leaves the impeller 538 in a manner known per se radially outwardly at a higher pressure. The pump 530 is thus designed as a multi step radial centrifugal pump. The fluid is supplied to the axially adjacent second pump step 536b of the first partial pump 534 after leaving the first pump step 536a of the first partial pump 534. A flow direction of the fluid therefore runs in the first partial pump 534 in FIG. 8 from right to left.

The first partial pump 534 is separated from the second partial pump 535 by a bounding element 512 which is axially arranged beside the second pump step 536b of the first partial pump 534. The bounding element 512 does not rotate with the drive shaft 539. In axial direction the second pump step 537b and then the first pump step 537a of the second partial pump 535 are adjoined to the bounding element 512, wherein the pump steps 537a, 537b of the second partial pump 535 are arranged mirrored in comparison to the pump steps 536a, 536b of the first partial pump 534. For this reason this arrangement of the two partial pumps 534 and 535 is referred to as a back-to-back arrangement.

The fluid is supplied to the first pump step 537a of the second partial pump 535 via a supply passage 540 which initially leads past the second pump step 537b of the second partial pump 535 at the outside and then radially inwardly to the inlet of the first pump step 537a of the second partial pump 535. The fluid is then guided to the inlet of the second partial pump step 537a of the second partial pump 535 arranged between the first pump step 537a and the bounding element 512 from the outlet of the first pump step 537a . The flow direction of the fluid in the second partial pump 535 therefore runs from left to right in FIG. 8, i.e. opposite to the flow direction in the first partial pump.

In order to guide the fluid from the first partial pump 534 to the second partial pump 535, the bounding element 512 has a first transfer passage 541 which leads from an outlet space 542 of the second pump step 536b of the first partial pump 534 to the supply passage 540 for the first pump step 537a of the second partial pump 535. Furthermore, the bounding element 512 has a second transfer passage 543 which leads from an outlet space 544 of the second pump step 537b of the second partial pump 535 to a high-pressure space 511, in the form of a pump outlet space, connected to the pump outlet 532. Therefore, the high-pressure space 511 adjoins the supply passage 540 at the first pump step 537a of the second partial pump 535, wherein the separation and sealing with regard to the termination element 513, designed as a housing, takes place by the bounding element 512. A pressure reduced in comparison to the high-pressure space 511 is present in the supply passage 540, so that the supply passage 540 can also be referred to as a low-pressure space. The termination element 513 designed as a housing has a cylindrical inner contour in the region of the bounding element 512. The sealing off between the high-pressure space 511 and the supply passage 540 takes place in accordance with the seal illustrated in FIG. 3, wherein an illustration of details such as, for example, the O-ring and the associated groove was omitted from FIG. 6. A functionally safe sealing is also ensured then when the termination element 513 in the form of the housing widens due to the pressure in the high-pressure space 511 through the functionality of the sealing described in the description of FIG. 3.

Figure 9:
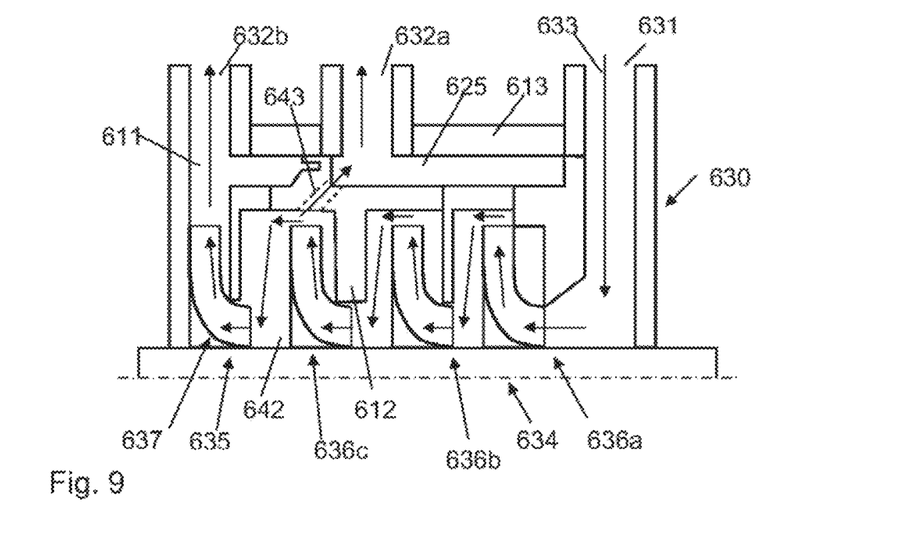
FIG. 9 a pump having two partial pumps and two pump outlets.

A pump 630 having a pump inlet 631 and a first pump outlet 632a and a second pump outlet 632b is illustrated in FIG. 9, wherein the flow of the fluid is also indicated by arrows 633. The pump 630 is also designed as a pump having a first partial pump 634 and a downstream second partial pump 635, wherein the first partial pump 634 has three pump steps 636a, 636b, 636c switched downstream of one another and the second partial pump 635 has a pump step 637. The first partial pump 634 is also separated from the second partial pump 635 by a bounding element 612.

The fluid is taken away from the outlet of the first partial pump 634 via the first pump outlet 632a . For this purpose the first pump outlet 632a is connected to an outlet space 642 of the third pump step 636c of the first partial pump 634 via a first pump outlet space 625 and a transfer passage 643 of the bounding element 612.

The outlet space 642 of the third pump step 636c is moreover also connected to the inlet of the pump step 637 of the second partial pump 635, so that the fluid flow is divided and, on the one hand, flows in the direction of the first pump outlet 632a and, on the other hand, flows to the second partial pump 635.

The second partial pump 635 conveys into a high-pressure space 611, in the form of a second pump outlet space, connected to the second pump outlet 632b . The pressure in the high-pressure space 611 is higher than in the pump outlet space 625, which therefore can be referred as a low-pressure space because of the increase in pressure through the second partial pump 635.

The termination element 613 designed as a housing has a cylindrical inner contour in the region of the bounding element 612. The sealing off of the high-pressure space 611 and the first pump outlet space 625 takes place according to the seal illustrated in accordance with FIG. 3, wherein an illustration of details, such as, for example, the O-ring and the associated groove are omitted from FIG. 9. The difference only consists therein that the high-pressure space 611 is arranged at the other side with regard to the bounding element 612. A functionally safe seal is also ensured then when the termination element 613 in the form of the housing widens due to the pressure in the high-pressure space 611 through the functionality of the seal described in the description with regard to FIG. 3.

The invention claimed is:

1. A sealing arrangement for a high-pressure space comprising:
    a bounding element which has an outer sealing surface and
    a termination element which has an inner sealing surface,
    wherein the outer sealing surface and the inner sealing surface are arranged such that a sealing-off of the high-pressure space is achieved via a contact of the two sealing surfaces,
    wherein the bounding element is configured so that a force, due to a pressure in the high-pressure space, in the direction of the inner sealing surface acts on the outer sealing surface and causes the outer sealing surface to press onto the inner sealing surface and the bounding element is a part of a housing of the high-pressure space or as a separation element to a different pressure space, and
    wherein the bounding element or the termination element has an integral projecting collar which forms at least a part of the outer sealing surface or of the inner sealing surface, said collar being configured so such that the pressure in the high-pressure space acts on an inner surface of the collar lying opposite of the outer sealing surface or the inner sealing surface.

2. The sealing arrangement in accordance with claim 1, wherein the bounding element has a recess open in the direction of the high-pressure space which recess is arranged such that at least a part of the outer sealing surface is arranged between the recess and the inner sealing surface of the termination element.

3. The sealing arrangement in accordance with claim 1, the termination element is configured such that a force can act on the inner sealing surface in the direction of the outer sealing surface due to the pressure in the high-pressure space.

4. The sealing arrangement in accordance with claim 3, the termination element has a second recess open in the direction of the high-pressure space which recess is arranged such that at least a part of the inner sealing surface is arranged between the second recess and the outer sealing surface of the bounding element.

5. The sealing arrangement in accordance with claim 1, wherein the bounding element or the termination element has a sealing element.

6. The sealing arrangement in accordance with claim 5, the sealing element is as an O-ring which is arranged in a groove of the bounding element or of the termination element.

7. The sealing arrangement in accordance with claim 5, wherein the bounding element and the termination element are arranged such that they form a reception space in which an O-ring is arranged.

8. The pump having a sealing arrangement in accordance with claim 1.

9. The pump in accordance with claim 8, further comprising at least a first partial pump and a second, downstream partial pump, wherein the bounding element is a separation element between the first and the second partial pump.

10. The pump in accordance with claim 9, wherein the high-pressure space is an outlet space of the second partial pump.

11. The pump in accordance with claim 9, further comprising a first pump outlet and a second pump outlet, wherein the first pump outlet is connected to an outlet of the first partial pump and the second pump outlet is connected to an outlet of the second partial pump and the bounding element is arranged between the first and the second partial pump outlet.

12. The pump in accordance with claim 9, wherein the first and the second partial pump are arranged such that a first flow direction in the first partial pump and a second flow direction in the second partial pump are orientated opposite from one another and the bounding element is arranged between the outlet of the first partial pump and an inlet of the second partial pump.

13. The pump in accordance with claim 8, wherein the bounding element has at least one transfer passage.

* * * * *